United States Patent [19]

Vollmerhausen

[11] 4,244,540
[45] Jan. 13, 1981

[54] SPECTRAL DISCRIMINATION SYSTEM FOR AN OPTICAL SEEKER

[75] Inventor: Richard H. Vollmerhausen, Ridgecrest, Calif.

[73] Assignee: The United States of America as represented by the Secretary of the Navy, Washington, D.C.

[21] Appl. No.: 948,948

[22] Filed: Sep. 21, 1978

[51] Int. Cl.³ .................. F41G 7/00; F42B 15/02; G06F 15/50
[52] U.S. Cl. .................................................. 244/3.16
[58] Field of Search ............................. 244/3.16, 3.13

[56] References Cited

U.S. PATENT DOCUMENTS

| | | | |
|---|---|---|---|
| 3,585,281 | 6/1971 | Jordan | 358/55 |
| 3,615,138 | 10/1971 | Pedrotti et al. | 356/153 |
| 3,624,272 | 11/1971 | Favreau | 358/55 |
| 3,679,290 | 7/1972 | Adams et al. | 354/299 |
| 3,752,587 | 8/1973 | Myers et al. | 356/153 |
| 3,756,726 | 9/1973 | Astheimer | 356/434 |
| 3,759,604 | 9/1973 | Thelen | 350/166 |
| 3,822,098 | 7/1974 | Rudder et al. | 356/320 |
| 4,003,635 | 1/1977 | Ottersberg et al. | 350/166 |
| 4,028,544 | 6/1977 | Jourdan et al. | 244/3.16 |
| 4,030,807 | 6/1977 | Briney | 244/3.16 |

Primary Examiner—Theodore M. Blum
Attorney, Agent, or Firm—R. S. Sciascia; W. Thom Skeer; Timothy R. Schulte

[57] ABSTRACT

Dichroic mirrors employed in an optical seeker system to achieve spectral discrimination. The dichroic mirrors are aligned so as to produce a reticle phase difference between different wavelengths of reflected optical energy. Background optic energy is spectrally balanced so no net guidance is given to the seeker.

6 Claims, 7 Drawing Figures

SPECTRAL DISCRIMINATION SYSTEM FOR AN OPTICAL SEEKER

BACKGROUND OF THE INVENTION

1. Field of the Invention

The invention relates to the field of radiation physics. More specifically, the invention relates to the field of infrared radiation. More particularly, the invention relates to the guidance of a missile in the presence of background radiation. In still greater particularity, the invention uses dichroic mirrors in a missile seeker system to balance interfering background or countermeasure radiation so as to produce no net missile guidance.

2. Description of the Prior Art

The reliability and effectiveness of optical seeker systems in missiles is affected by outside infrared radiation sources such as sunlit backgrounds or countermeasure flares. Various methods and devices for alleviating this problem have been attempted. One approach has been to cancel signals from sunlit backgrounds and countermeasure flares by making the modulation efficiency of a reticle dependent upon the spectral nature of the source.

One system for spectral discrimination in seeker systems used spectral band pass filters as alternate spokes of a reticle. Spectral filters, however, only allow reflection of predetermined wavelengths of optical energy to achieve background suppression and spectral balancing. In addition, the fabrication of a reticle utilizing this concept is extremely difficult.

Spectral discrimination remains a viable concept however and a seeker system utilizing it would give greater accuracy to the seeker system.

SUMMARY OF THE INVENTION

Spectral discrimination is achieved in a missile seeker system by substituting dichroic mirrors for the secondary mirrors. The dichroic mirrors reflect light at different angles depending on the light's wavelength. The mirrors are aligned so as to give the different wavelengths a constant angular offset on a reticle, that is, a different reticle phase. The reticle phase difference results in a balancing of the background signals such that there is no net guidance to the seeker.

DESCRIPTION OF THE PREFERRED EMBODIMENT

Figure 1:
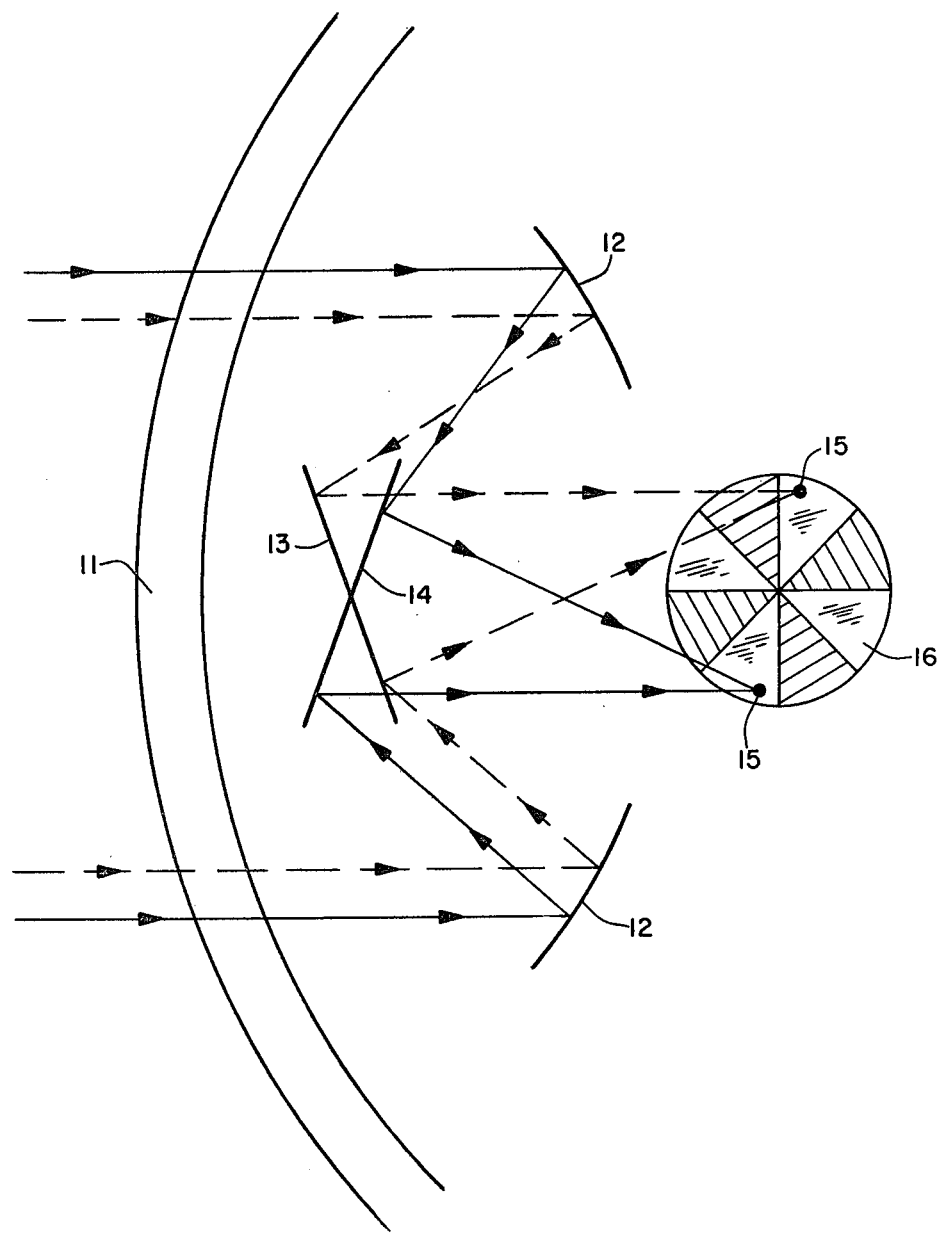
FIG. 1 is a perspective view of the optical seeker system.

Referring to FIG. 1, the seeker system is housed behind an optically transparent dome 11. A pair of primary mirrors 12 are mounted so as to reflect optical energy to a pair of dichroic mirrors 13 and 14. Primary mirrors 12 can be one circular mirror or segments as shown. Primary mirrors 12 serve as an aperture for a reflecting telescope which is used to collect light for all spectral bands. A reticle 16 is positioned so as to receive optical energy from dichroic mirrors 13 and 14 in a predetermined arrangement such as that illustrated with a pair of predetermined points 15 on the reticle. Reticle 16 is shown rotated 90° for purposes of illustration. Reticle 16 faces dichroic mirrors 13 and 14. An electro-optic transducer (not shown) is positioned behind reticle 16.

Figure 2:
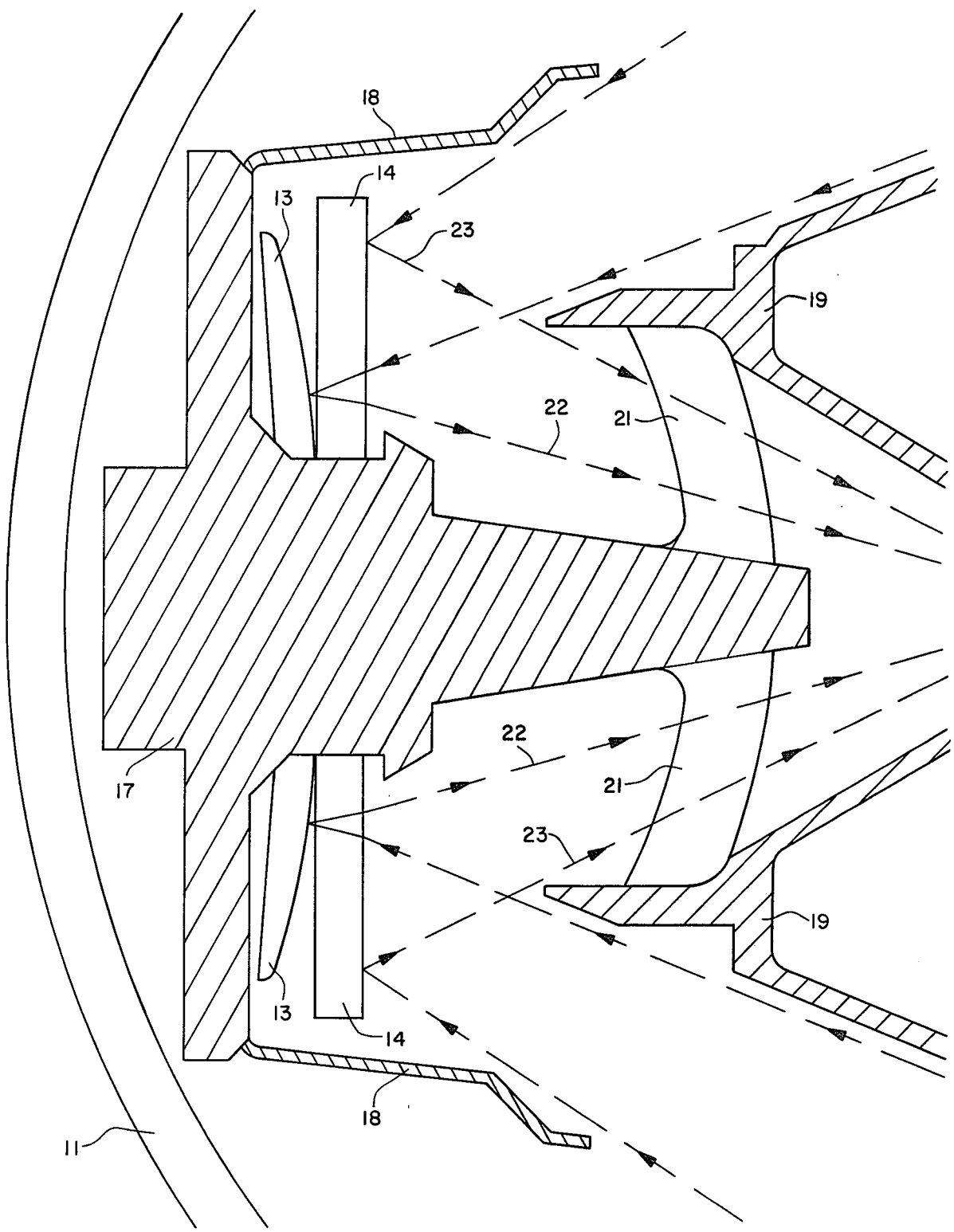
FIG. 2 is a detailed view of the dichroic mirror assembly.

Referring to FIG. 2, dichroic mirrors 13 and 14 are mounted on a gyroscope frame 17. A pair of sun shades 18 are mounted on gyroscope frame 17 to prevent outside optical energy from directly entering the system. Sun shades 18 limit outside optical energy to a desired field-of-view for target search. A pair of optically transparent support discs 21 are attached to gyroscope housing 17 and to a pair of supports 19. A reflected optical energy beam 22 represents the background wavelength reflected from dichroic mirror 13. A reflected optical energy beam 23 represents the target wavelength reflected from the dichroic mirror 14.

Figure 4:
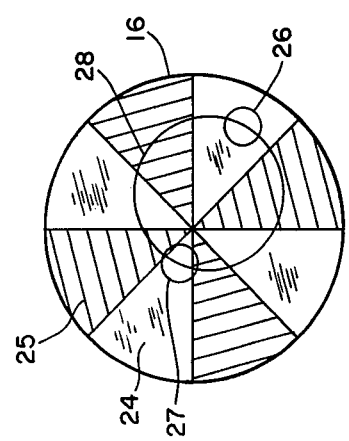
FIG. 4 shows different wavelengths being offset by 180° on a reticle.

Referring to FIG. 4, reticle 16 is shown having alternately optically opaque sections 25 and transparent sections 24. Short wavelength blur circle 27 and long wavelength blur circle 26 are shown wherein blur circle 27 is 180° out of reticle phase with blur circle 26. The diameter of rotation 28 of blur circles 26 and 27 is determined by the angular displacement of the dichroic mirrors.

Figure 6:
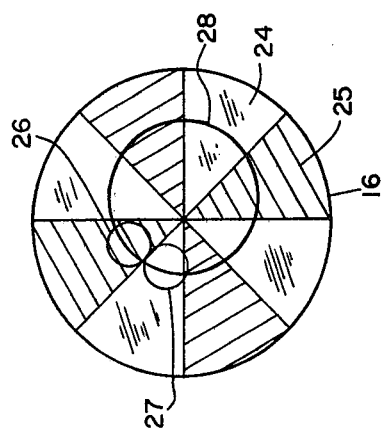
FIG. 6 shows different wavelengths being offset by one section on a reticle.

In FIG. 6, reticle 16 is shown having alternately opaque sections 25 and optically transparent sections 24. Short wavelength blur circle 27 and long wavelength blur circle 26 are shown out of phase by one section width. The diameter of rotation 28 of blur circle 26 and 27 is determined by the angular displacement of the dichroic mirrors.

MODE OF OPERATION

Referring to FIG. 1, optical energy is incident on optically transparent dome 11 and passes therethrough. The optical energy is then reflected from a pair of primary mirrors 12 to dichroic mirrors 13 and 14. Dichroic mirrors 13 and 14 in turn reflect specified wavelengths of optical energy to reticle 16 at specified points 15.

Figure 3:
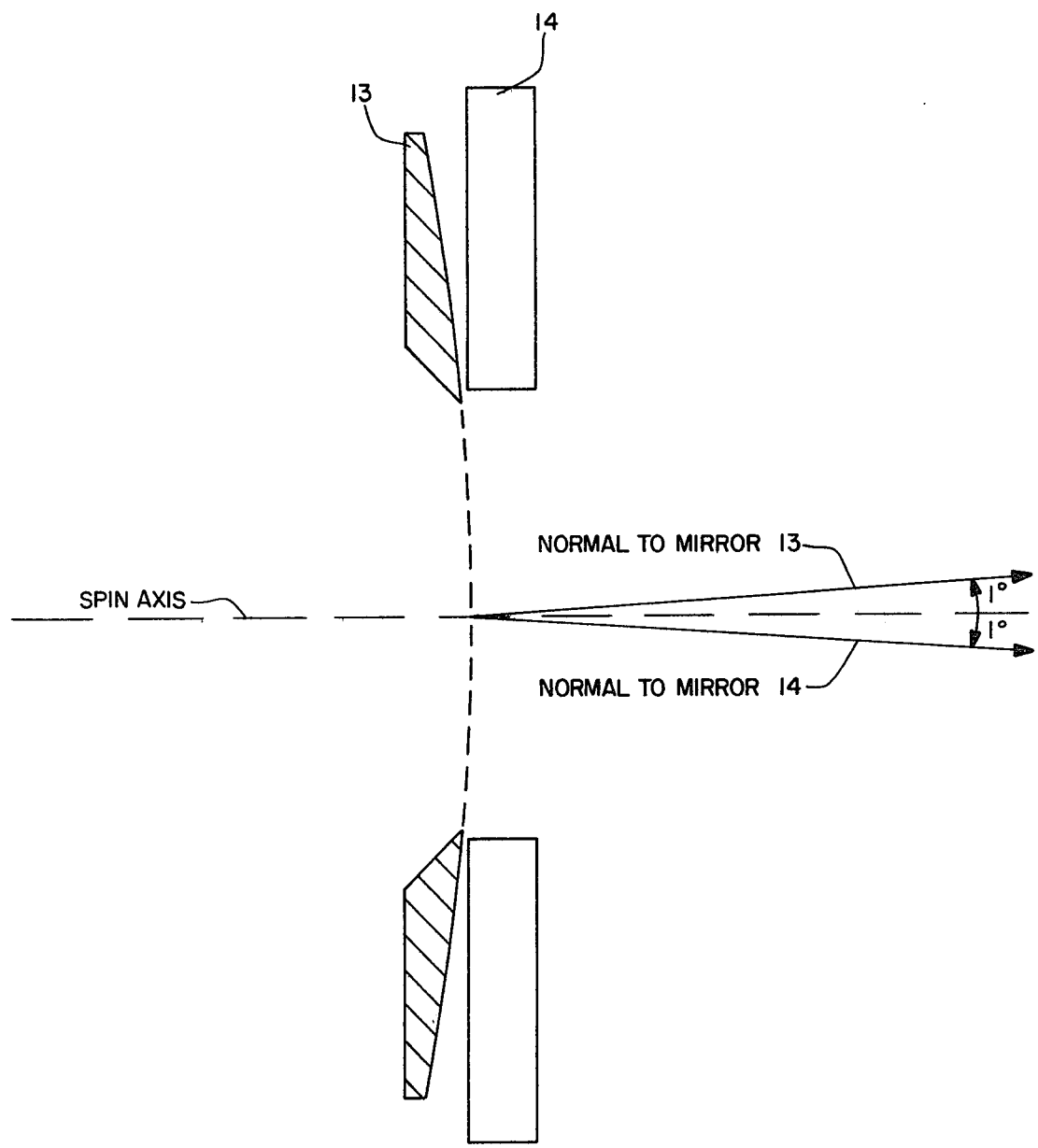
FIG. 3 shows the optical alignment of the dichroic mirrors about the spin axis.

Referring to FIG. 2, dichroic mirrors 13 and 14 are gyroscopically mounted and are rotating relative to the reticle. Support discs 21 are optically transparent and may act as a lens to further focus optical energy beams 22 and 23 onto the reticle. Referring to FIG. 3, dichroic mirrors are spinning in a circular motion about the spin axis. Referring to FIG. 4, the optical energy reflected by dichroic mirrors 13 and 14 is focused onto reticle 16 in the form of blur circles 26 and 27 which move in a circular path 28 on reticle 16. The diameter of circular path 28 is determined by the angular displacement of dichroic mirrors 13 and 14. In the present embodiment each of the mirrors is displaced 1° with respect to the spin axis as shown in FIG. 3.

The optical energy transmitted through reticle 16 is incident on an electro-optic transducer (not shown) which uses the perceived signals to guide the missile toward the source of optic energy. Because the source of optic energy may not be a target but may instead be a background signal such as reflected sunlight from a cloud, some means of spectral discrimination is needed.

Again referring to FIG. 2, sunshades 18 prevent optical energy other than that reflected from the primary mirrors from directly entering the system. Optical energy which has been reflected from the primary mirrors is incident on dichroic mirror 13. Both dichroic mirrors 13 and 14 are selected and oriented to allow only certain predetermined wavelengths of optical energy to be reflected. The optical energy not reflected by dichroic mirror 14 passes through dichroic mirror 14 and is reflected by dichroic mirror 13. The two wavelengths of interest are reflected onto reticle 16.

The reflected optical energy beams 22 and 23 from dichroic mirrors 13 and 14 respectively are of a wavelength determined by the type of dichroic mirror selected. Dielectric sheets are used in conjunction with mirrors to produce the desired dichroic mirror. This process is well known in the art and the resultant dichroic mirror is sometimes called a dielectric filter.

In the near infrared region of the spectrum there are three irradiance peaks for reflected sunlight. These peaks are at, approximately, 1.6, 2.2, and 4 microns. Spectral balancing occurs when the response of the electro-optic detector and the seeker for 2.2 micron wavelengths is equivalent to that for 1.6 or 4 microns, that is, there is no net guidance to the seeker. A target, such as a jet afterburner also has irradiance peaks dependent upon wavelength. These peaks correspond to the background spectrum except that the 4 micron peak is far stronger than either the 2.2 or the 1.6 micron wavelength peak.

By using dichroic mirrors, the wavelengths of optic energy can be separated. That is, the desired wavelength can be selected from the entire infrared region of the spectrum. If the two wavelengths of interest are 2.2 microns and 4 microns, then, by rotating the dichroic mirror to produce a phase difference, these two wavelengths may be balanced such that no net guidance is given to the seeker.

Referring to FIG. 4, the dichroic mirrors are rotated with respect to each other to produce a 180° reticle phase difference. Blur circles 26 and 27 are diametrically opposed on reticle 16. If the intensity of blur circles 26 and 27 is approximately equal then there will be no net guidance to the seeker. This is the case with reflected sunlight. Because the irradiance peaks for sunlight are about equal at 2.2 and 4 microns, there is no net guidance if the two signals are 180° out of phase. A target such as a jet afterburner on the other hand has a much stronger irradiance peak at 4 microns than at 2.2 microns. Therefore the electro-optic detector receives a stronger signal from one area on reticle 16 than from the other if a target, rather than reflected sunlight, is the source of the incident optical energy.

Because reticle 16 has alternatively transparent and opaque sections 24 and 25 respectively, the light incident on the electro-optic detector is chopped. That is, when the dichroic mirrors and their respective blur circles are spinning with respect to the reticle, the electro-optic detector sees a frequency modulated signal. If the diameter of the blur circle rotation is fixed by the angular displacement of the mirrors then any movement of the blur circles out of this circular rotation must be due to a changing target position with respect to the seeker system.

Referring to FIG. 4, blur circle 27 is closer to the center of reticle 16 than is blur circle 26. Therefore, the frequency detected by the electro-optic detector will be higher for blur circle 27 than for blur circle 26. It is this difference for which the seeker circuitry directs the missile to keep the diameter of rotation 28 and reticle 16 concentric. The missile is then "on target". That is, the seeker moves the missile in the direction of the higher frequency. This system is known as a conical scan seeker system.

Figure 5:
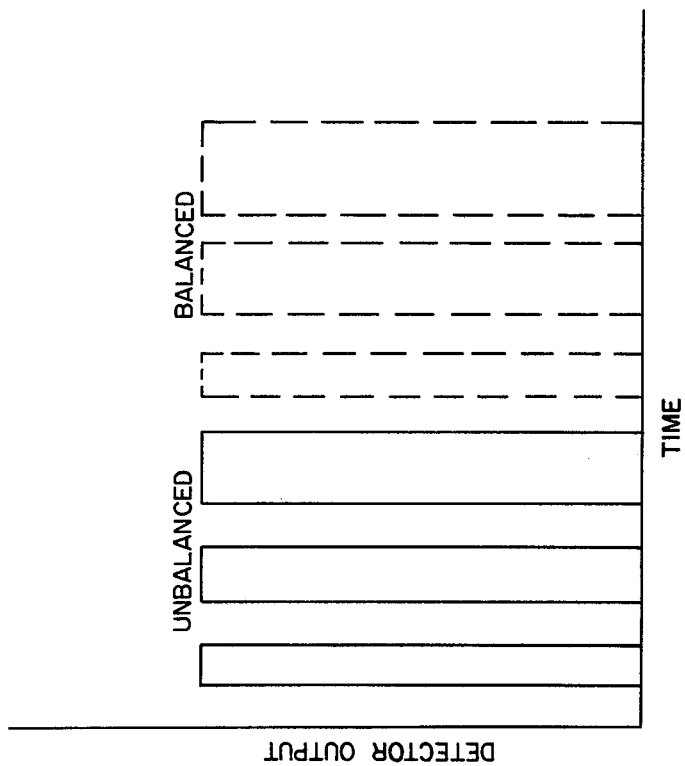
FIG. 5 is a graph of the detector output for the offset of FIG. 4.

FIG. 5 shows the comparison of balanced versus unbalanced background signals for the 180° reticle phase background signals. The balanced condition occurs when there are constant frequency detector output peaks to balance one another whereas the unbalanced condition results when only a limited number of detector output peaks occur.

Figure 7:
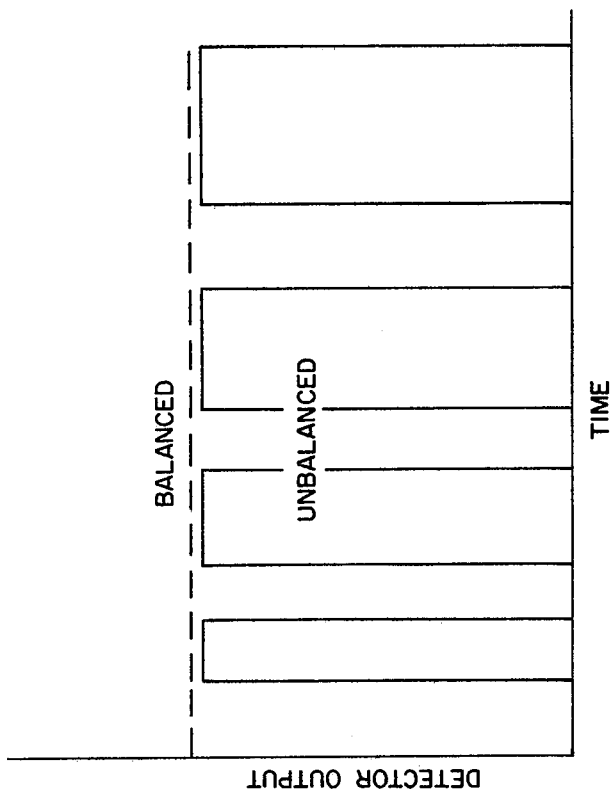
FIG. 7 is a graph of the detector output for the offset of FIG. 6.

FIG. 6 illustrates an alternative embodiment wherein the dichroic mirrors are rotated so as to produce a phase shift corresponding to one section 24 or 25 of reticle 16. If the signals are balanced then a continuous detector output will be observed by the detector. This is illustrated in FIG. 7.

The invention herein described may be used to eliminate various types of optical energy interference. For example, if it is desired to eliminate the signals from countermeasure flares, then the dichroic mirrors could be selected to balance the spectrum produced by these flares. In this way any interference having a known spectrum may be eliminated.

The disclosed invention may be employed in a variety of optical seeker systems. For example, an optical seeker system utilizing a plurality of electro-optic transducers rather than a reticle may employ dichroic mirrors for spectral balancing.

An example of a multi-detector optical seeker is a crossed array system which uses four sets of multi-spectral detectors in a cross pattern. Each set consists of a 2.2 micron and a 4 micron detector placed side by side. The signal from the 2.2 micron detector cancels the signal from the 4 micron detector if the 2.2 micron signal exceeds a preset ratio with the 4 micron signal.

Dichroic mirrors could be employed in the crossed array system to eliminate the 2.2 micron detector. The four remaining detectors would then be made to respond to both spectral bands. The dichroic mirrors are used to achieve a phase separation such that the 2.2 micron signal is received first and is compared with the 4 micron signal. If the 2.2 micron signal is large enough in relation to the 4 micron signal then both signals are ignored.

What is claimed is:

1. A conical scan optical seeker system for spectral discrimination of targets comprising:
    a gyroscopic frame;
    at least one primary mirror serving as an aperture to focus incoming light to said seeker system;
    at least one dichroic mirror placed in the path of said focused light to divide said focused incoming light into at least two blur circles which represent separate locations for focusing light of different preselected wavelengths; and
    detection means for observing the presence of said different preselected wavelengths at each of said blur circles.

2. A conical scan optical seeker system for spectral discrimination of targets as described in claim 1 wherein the number of dichroic mirrors is two.

3. A conical scan optical seeker system for spectral discrimination of targets as described in claim 1 wherein the number of blur circles is two.

4. A conical scan optical seeker system for spectral discrimination of targets as described in claim 1 wherein said detection means comprises an electro-optic transducer behind a reticle.

5. A conical scan optical seeker system for spectral discrimination of targets as described in claim 1 further comprising a sun shade mounted to said gyroscopic frame to prevent outside optical energy from entering said seeker system unless it is in a predetermined field-of-view for said seeker system.

6. A conical scan optical seeker system for spectral discrimination of targets comprising:

a gyroscopic frame;

at least one primary mirror serving as an aperture to focus incoming light to said seeker system;

a pair of dichroic mirrors placed in the path of said focused light to divide said focused incoming light into two separate and distinct blur circles for light of different preselected wavelengths;

an electro-optic transducer behind a reticle for observing the presence of said different preselected wavelengths, said reticle placed to intercept said separate blur circles; and a sunshade mounted to said gyroscopic frame to prevent outside optical energy from entering said seeker system unless it is in a predetermined field-of-view for said seeker system.

* * * * *